United States Patent [19]

Allam

[11] Patent Number: 4,461,154
[45] Date of Patent: Jul. 24, 1984

[54] METHOD AND APPARATUS FOR COMPRESSING GAS

[75] Inventor: Rodney J. Allam, St. Catherines, England

[73] Assignee: Air Products and Chemicals, Inc., Allentown, Pa.

[21] Appl. No.: 388,375

[22] Filed: Jun. 14, 1982

[30] Foreign Application Priority Data

Jun. 18, 1981 [GB] United Kingdom ............... 8118865

[51] Int. Cl.³ .............................................. F25B 9/00
[52] U.S. Cl. .......................................... 62/87; 62/402
[58] Field of Search ........................... 62/87, 401, 402

[56] References Cited

U.S. PATENT DOCUMENTS 2,494,120 1/1950 Ferro, Jr. ............................... 62/87
3,535,210 10/1970 Linde et al. ........................... 62/333

Primary Examiner—Ronald C. Capossella
Attorney, Agent, or Firm—Mark L. Rodgers; E. Eugene Simmons; James C. Simmons

[57] ABSTRACT

The fuel required to provide the energy for compressing a gas can be reduced by compressing the gas substantially adiabatically through a pressure ratio of at least 2.5:1 in a compressor, cooling the hot compressed gas by heat exchange with water at superatmospheric pressure, further heating the water to produce superheated steam and using the superheated steam to drive the compressor. The total amount of fuel consumed can be considerably less than that used for compressing gas conventionally (i.e. substantially isothermally).

9 Claims, 3 Drawing Figures

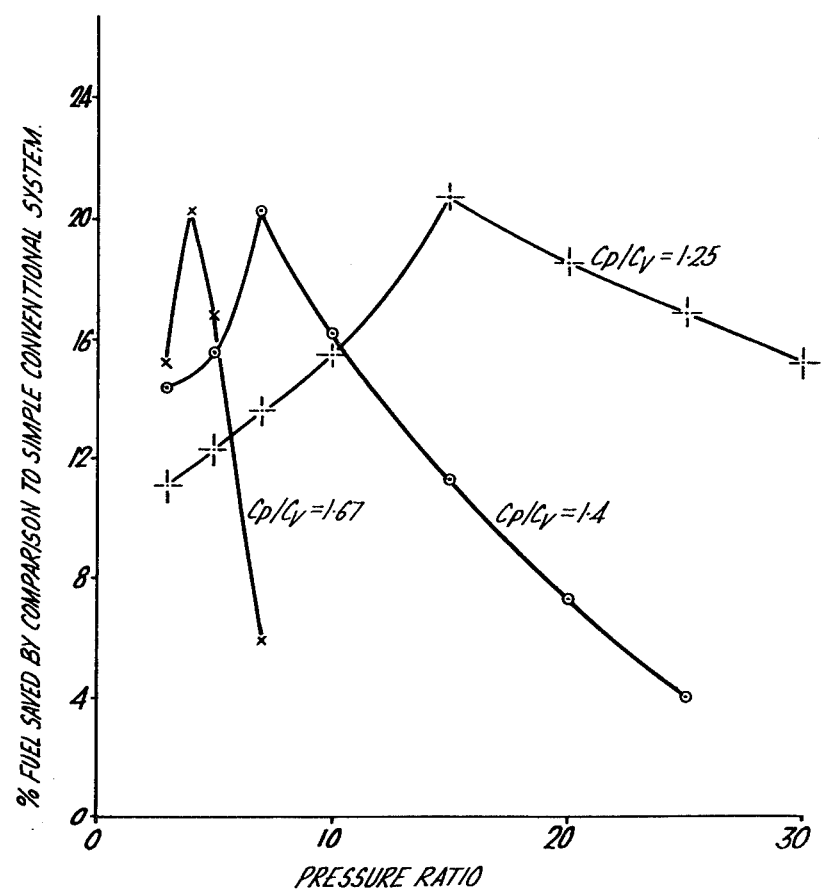

METHOD AND APPARATUS FOR COMPRESSING GAS

This invention relates to a method and an apparatus for compressing gas.

A number of industrial processes rely on the continuous supply of gas at elevated pressure. Amongst these are the cryogenic separation of air where the feed air is typically required at 5 to 9 bars absolute, and the synthesis of ammonia where the ammonia synthesis gas is typically required at between 100 and 250 bars absolute.

Heretofore, it has been considered good practice to compress gas in a generally isothermal manner and for this reason all compressors on air separation plant and ammonia plant known to us comprise a plurality of compression stages separated by inter-coolers. The intercoolers are normally cooled with air or water and whilst attempts have been made to recover energy from the cooling water the amount of useful energy recovered has been minimal due to the relatively low temperature of the cooling water which is typically between 80° C. and 130° C.

We have discovered that, contrary to established practice, compression should be carried out substantially adiabatically. Provided that the compression ratio is sufficiently high, gas leaving the compressor will be at a temperature sufficient to provide high grade energy which can be used to assist in driving the compressor. Although the amount of fuel required to compress a gas adiabatically is greater than the amount of fuel required to compress the gas isothermally, under favourable conditions, useful energy can be recovered from the adiabatically compressed gas which, when used, directly or indirectly, to assist in driving the compressor, can result in less fuel being used to compress the gas than is used in a conventional isothermal compressor. In contrast, the amount of useful energy which can be recovered from the intercoolers associated with conventional, i.e. isothermal, compressors is, in comparison, very small.

According to the present invention there is provided a method of compressing gas, which method comprises the steps of compressing said gas in a generally adiabatic manner through a pressure ratio of at least 2.5:1 to produce a hot gas, cooling said hot gas by heat exchange with a coolant and using said coolant to provide part of the energy to compress said gas.

In many installations it is envisaged that there will only be a single gas compressor and in such an embodiment the energy will be returned, either directly or indirectly, to assist in driving the single compressor. In the case of a train of compressors the energy associated with the coolant leaving, for example the first compressor, could be used to assist in driving, for example the second or third compressor in the train although it is envisaged that, in practice, the energy would be returned to a common source for allocation to all the compressors.

The optimum pressure ratio through which the gas should be compressed varies according to the ratio of specific heat at constant pressure to specific heat at constant volume (Cp/Cv) of the gas and according to the coolant. For most practical purposes, the coolant will be water and under typical operating conditions, for a gas having a Cp/Cv of about 1.67 (i.e. a monotomic gas) the optimum pressure ratio is about 4:1 with pressure ratios in the range 2.5:1 to 8:1 and more preferably 3:1 to 7:1 being quite acceptable. In the case of a gas with a Cp/Cv of 1.4, (i.e. a diatomic gas) the optimum pressure ratio is about 7:1 with pressure ratios in the range 2.5:1 to 30:1 and more preferably 4:1 to 20:1 being beneficial. In the case of a gas with a Cp/Cv of 1.25 (i.e. a triatomic gas) the optimum pressure ratio is about 15:1 with pressure ratios in the range 2.5:1 to 75:1 and more preferably 6:1 to 50:1 being beneficial. For gases of lower Cp/Cv the optimum pressure ratio will be higher. For a mixture of gases the optimum pressure ratio can be calculated knowing the ratio of Cp/Cv. However, for initial evaluation purposes a gas mixture with a Cp/Cv greater than 1.55 can be regarded as having the same optimum and preferred pressure ratios as a monatomic gas. Similarly, a gas mixture with a Cp/Cv less than 1.33 cm can be regarded as having the same optimum and preferred pressure ratios as a triatomic gas. Gas mixtures with a Cp/Cv between 1.33 and 1.55 can be regarded as having the same optimum and preferred pressure ratios as a diatomic gas.

It would appear that there is a pressure ratio beyond which the present invention has little or no advantage over the prior art isothermal systems. This pressure ratio is in excess of an estimated 9:1 for gases where Cp/Cv=1.67, in excess of an estimated 32:1 for gases where Cp/Cv=1.4 and in excess of an estimated 80:1 for a gas where Cp/Cv=1.25.

Preferably the hot gas will be cooled by heat exchange with water preferably under superatmospheric pressure. In such an embodiment the heated water is preferably subsequently vaporized in a boiler and the vapour expanded through a steam turbine arranged to drive the compressor.

Heat exchange from the hot gas to the coolant may be direct or indirect.

The present invention also provides an apparatus for compressing gas, which apparatus comprises a compressor for, in use, compressing gas in a generally adiabatic manner through a pressure ratio of at least 2.5:1 (and preferably at least 3:1) to produce a hot gas, a heat exchanger in which heat from said hot gas can be transferred to a coolant and means for recovering at least part of the heat transferred to said coolant and using it to compress said gas.

Preferably, said coolant comprises a liquid and said means comprises a boiler to vaporize said liquid.

Advantageously, said liquid is water and said means further comprises a steam turbine connected to said compressor and arranged, in use, to receive steam from said boiler.

The present invention is applicable to substantially all situations in which gases are compressed. Several applications are of particular commercial importance and the present invention therefore provides an air separation plant provided with an apparatus in accordance with the present invention; an ammonia synthesis plant provided with an apparatus in accordance with the invention; an ethylene plant provided with an apparatus in accordance with the invention; a urea synthesis plant provided with an apparatus in accordance with the invention; a natural gas compression and/or liquifaction plant provided with an apparatus in accordance with the invention and a methanol plant provided with an apparatus in accordance with the present invention.

For a better understanding of the present invention reference will now be made, by way of example, to the accompanying drawings in which:

FIG. 3 is a graph showing the percentage of fuel which can be saved according to the pressure ratio used and the ratio of (Cp/Cv) of the gas being compressed.

Figure 1:
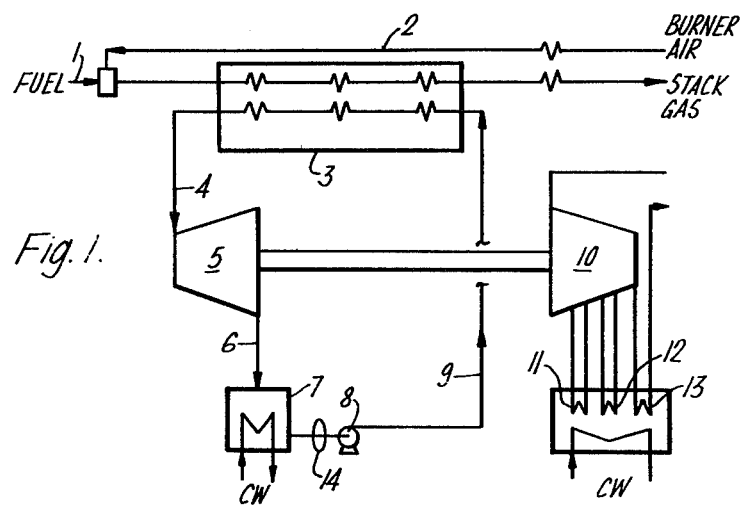
FIG. 1 shows a known apparatus for compressing gas.

Referring to FIG. 1, fuel from line 1 is mixed with air from line 2 and burnt. The resulting hot gas is used to raise superheated steam at 900 psia (62 bars A) and 900° F. (482° C.) in boiler 3. The stack gas leaving boiler 3 is used to preheat the air in line 2 as shown.

The superheated steam leaves boiler 3 through line 4 and is expanded to 0.7 psia (0.05 bars A) through steam turbine 5 which it leaves through line 6 at 90° F. (32.2° C.). The water vapour is then condensed against cooling water in condenser 7. It is then deaerated in steam deaerator 14, repressurized by pump 8 and recycled to the boiler 3 via line 9 as shown.

The steam turbine 5 is mechanically coupled to air compressor 10 which has three stages separated by water cooled intercoolers 11 and 12. The compressed air leaving all three stages is cooled to 80° F. (26.6° C.).

Typically, the amount of fuel required in the apparatus described with reference to FIG. 1 to compress 218,000 kg/hr of air from atmospheric pressure to 90.5 psia (6.25 bar A) (for example for a 1130 MT/d oxygen plant) is $149.1 \times 10^6$ BTU/Hr. (43,700 kW).

Figure 2:
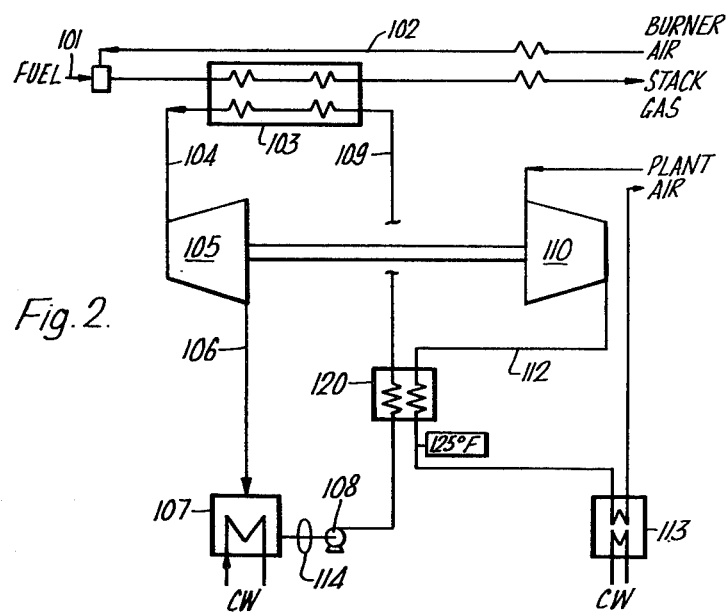
FIG. 2 shows an apparatus in accordance with the invention.

Referring to FIG. 2, fuel from line 101 is mixed with air from line 102 and burnt. The resulting hot gas is used to raise superheated steam at 900 psia (62 bars A) and 900° F. (482° C.) in boiler 103. The stack gas leaving boiler 103 is used to pre-heat the air in line 102 as shown. The stack gas exit temperature is the same in both Figures.

The superheated steam leaves boiler 103 through line 104 and is expanded to 0.7 psia (0.05 bars A) through steam turbine 105 which it leaves through line 106 at 90° F. (32.2° C.). The water vapour is then condensed in condenser 107. It is then deaerated in vacuum deaerator 114, repressurized by pump 108, pre-heated to 494° F. (257° C.) in heat exchanger 120 and recycled to the boiler 103 via line 109 as shown.

The steam turbine 105 is mechanically coupled to air compressor 110 which has a single casing with no intercoolers (i.e. a substantially adiabatic compressor) and a pressure ratio of (92.2/14.2)=6.3:1. The air enters the air compressor 110 through conduit 111 and leaves through conduit 112 at 92.2 psia (6.36 bars A) and 511° F. (266° C.). The hot air is then cooled to 125° F. (51.7° C.) in heat exchanger 120 before being cooled to 80° F. (26.7° C.) in cooler 113.

The amount of fuel required in the apparatus described with reference to FIG. 2 to compress 218,000 Kg/hr of air from ambient to 90.5 psia (6.25 bars A) is $123.1 \times 10^6$ BTU/Hr (36,100 KW) which represents a fuel saving in excess of 17% over the embodiment shown in FIG. 1.

FIG. 3 shows how the amount of fuel which can be saved depends on the ratio of Cp/Cv of the gas. Thus for air, which has a Cp/Cv of approximately 1.4, the optimum pressure ratio is 7:1. If it was desired, for example to compress air from 1 to 49 bars the preferred arrangement would be to compress the air from 1 to 7 bars generally adiabatically, cool the exiting gas against coolant, compress the cooled gas from 7 to 49 bars generally adiabatically, and then cool the exiting gas against coolant. Subject to a little fine tuning this arrangement will lead to the greatest fuel saving compared with the prior art. In this connection it should be noted that the precise optimum varies according to the adiabatic efficiency of the generally adiabatic compressor, the isothermal efficiency of the prior art compressor against which it is being compared, the precise ratio of Cp/Cv of the gas in question at the pressure and temperature in question, and the temperature and pressure of the steam. In most practical installations we envisage that the pressure ratios used will lie in the ranges indicated hereinbefore. It should perhaps be explained that in the embodiment shown in FIG. 2 the 6.3:1 pressure ratio was used to achieve the operating pressure required in one of our standard air separation plants.

Various modifications to the embodiments described with reference to FIG. 2 are envisaged. Thus, whilst in the preferred embodiment energy is directly returned to the compressor via steam, it could also be returned to the compressor indirectly. Thus, if the compressor were driven by an electric motor the coolant could be used to drive a generator-loaded turbine and the electricity generated returned to the grid.

The generally adiabatic compressor for use in the present invention should have as a high an adiabatic efficiency as possible. Although not essential it is recommended that the adiabatic efficiency should be at least 75% and preferably greater than 83%.

I claim:

1. A method of compressing a gas which method comprises the step of: compressing said gas in a generally adiabatic manner in a compressor through a pressure ratio of at least 2.5:1 to produce a hot gas; cooling said hot gas by heat exchange with a coolant, thereby transferring heat from the hot gas to the coolant; further heating said coolant, if necessary, in a boiler and recovering at least part of the heat transferred to said coolant and utilizing it to power said compressor.

2. A method according to claim 1, wherein said gas has a Cp/Cv ratio greater than 1.55 and said pressure ratio is between 2.5:1 and 8:1.

3. A method according to claim 1, wherein said gas has a Cp/Cv ratio between 1.55 and 1.33 and said pressure ratio is between 2.5:1 and 30:1.

4. A method according to claim 1, wherein said gas has a Cp/Cv ratio less than 1.33 and said pressure ratio is between 2.5:1 and 75:1.

5. A method according to claim 1, 2, 3 or 4, wherein said hot gas is cooled by heat exchange with water under superatmospheric pressure.

6. A method according to claim 5, wherein said water is subsequently vaporized in a boiler and said vapor is expanded through a steam turbine arranged to drive said compressor.

7. An apparatus for compressing a gas which comprises, in combination:
(a) a compressor for compressing the gas in a generally adiabatic manner to produce a hot gas;
(b) a heat exchanger in fluid communication with said compressor through which the hot gas can pass causing heat from said hot gas to be transferred to a coolant being passed through said heat exchanger;
(c) a vaporizing means for vaporizing the coolant, if necessary, after said coolant passes through the heat exchanger, said vaporizing means being in fluid communication with the heat exchanger; and (d) a means for recovering at least part of the heat transferred to said coolant and using it to compress said gas, said means being in fluid communication with said vaporizing means.

8. An apparatus as claimed in claim 7, wherein said coolant is a liquid and said vaporizing means is a boiler.

9. An apparatus as claimed in claim 8, wherein said liquid is water and wherein said means heat recovery comprises a steam turbine connected to said compressor and arranged, in use, to receive steam from said boiler.

* * * * *